United States Patent
Vogt

(10) Patent No.: US 12,227,248 B2
(45) Date of Patent: Feb. 18, 2025

(54) METHOD FOR PROTECTING COMPONENTS OF A STEER-BY-WIRE STEERING SYSTEM, AND STEER-BY-WIRE STEERING SYSTEM

(71) Applicant: ZF Friedrichshafen AG, Friedrichshafen (DE)

(72) Inventor: Dominik Vogt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 135 days.

(21) Appl. No.: 18/040,209

(22) PCT Filed: Jun. 23, 2021

(86) PCT No.: PCT/EP2021/067168
§ 371 (c)(1),
(2) Date: Feb. 1, 2023

(87) PCT Pub. No.: WO2022/028773
PCT Pub. Date: Feb. 10, 2022

(65) Prior Publication Data
US 2023/0294764 A1  Sep. 21, 2023

(30) Foreign Application Priority Data
Aug. 7, 2020 (DE) .................. 10 2020 210 048.9

(51) Int. Cl.
*B62D 7/14* (2006.01)
*B62D 5/00* (2006.01)

(52) U.S. Cl.
CPC ............. *B62D 7/148* (2013.01); *B62D 5/001* (2013.01); *B62D 7/146* (2013.01)

(58) Field of Classification Search
CPC ......... B62D 7/148; B62D 7/146; B62D 5/001
See application file for complete search history.

(56) References Cited

U.S. PATENT DOCUMENTS 4,887,632 A * 12/1989 Tanaka ................ B62D 7/1563
                                                180/441
7,878,512 B2   2/2011 Horiuchi et al.
(Continued)

FOREIGN PATENT DOCUMENTS

| DE | 10 2013 221 951 A1 | 4/2015 |
| DE | 10 2018 208 199 A1 | 11/2019 |
| DE | 10 2019 206 913 B3 | 2/2020 |

OTHER PUBLICATIONS

German Patent Office, Office Action Corresponding to 10 2020 210 048.9 (mailed Mar. 24, 2021).
(Continued)

*Primary Examiner* — George C Jin
(74) *Attorney, Agent, or Firm* — Finch & Maloney PLLC

(57) ABSTRACT

A method is disclosed for protecting the components of a steer-by-wire steering system, where the steer-by-wire steering system comprises a self-locking spindle drive in which the spindle is displaced linearly by driving a positionally fixed spindle nut in rotation. As a function of the speed of the vehicle, the linear displacement of the spindle relative to the spindle nut is summed continuously with respect to time until a first threshold value has been reached. A control unit, a non-transitory computer-readable storage medium, and a steer-by-wire system are also disclosed.

10 Claims, 3 Drawing Sheets

(56) References Cited

U.S. PATENT DOCUMENTS

| | | | |
|---|---|---|---|
| 8,831,838 B2 | 9/2014 | Yanagi | |
| 2008/0203690 A1* | 8/2008 | Horiuchi | B60L 15/20 |
| | | | 318/473 |
| 2014/0214275 A1* | 7/2014 | Miller | B62D 5/04 |
| | | | 701/41 |
| 2018/0057042 A1* | 3/2018 | Zientek | B62D 5/0463 |
| 2020/0125108 A1* | 4/2020 | Ogihara | B60K 28/10 |
| 2023/0001983 A1* | 1/2023 | Yamashita | B62D 6/008 |
| 2023/0219618 A1* | 7/2023 | Ishino | B62D 5/0496 |
| | | | 180/402 |
| 2023/0294764 A1* | 9/2023 | Vogt | B62D 7/146 |
| | | | 701/41 |

OTHER PUBLICATIONS

European Patent Office, International Search Report Corresponding to PCT/EP2021/067168 (mailed Sep. 22, 2021).
European Patent Office, Written Opinion Corresponding to PCT/EP2021/067168 (mailed Sep. 22, 2021).

* cited by examiner

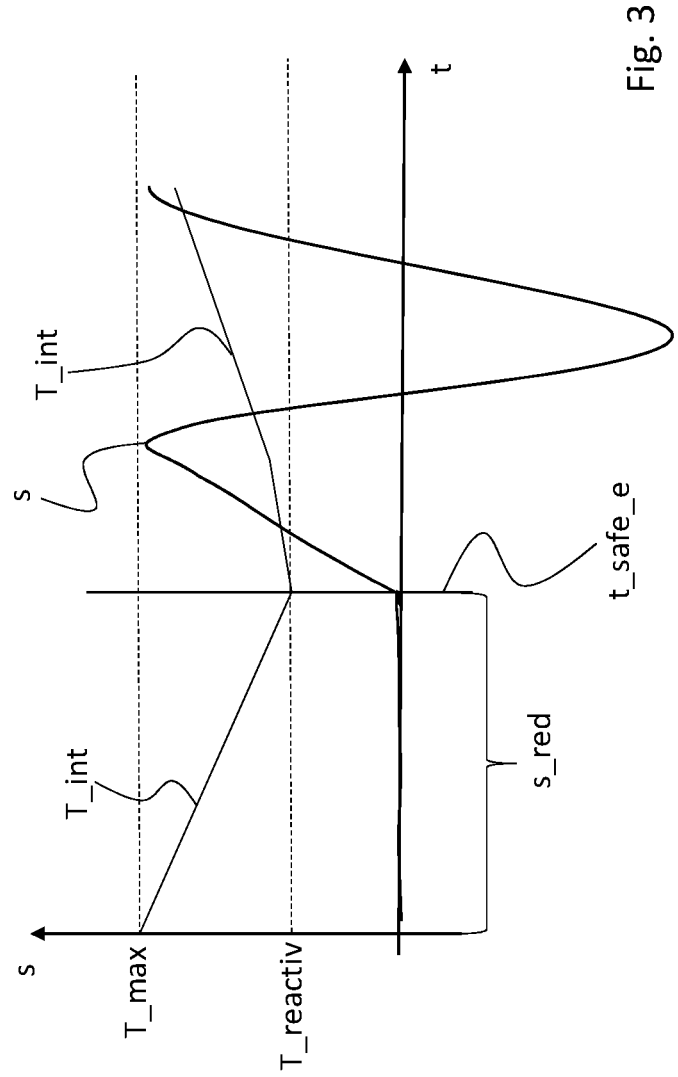

METHOD FOR PROTECTING COMPONENTS OF A STEER-BY-WIRE STEERING SYSTEM, AND STEER-BY-WIRE STEERING SYSTEM

RELATED APPLICATIONS

This application claims the benefit under 35 U.S.C. § 371 as a U.S. National Phase Application of application no. PCT/EP2021/067168, filed on 23 Jun. 2021, which claims benefit of German Patent Application no. 10 2020 210 048.9 filed 7 Aug. 2020, the contents of which are hereby incorporated herein by reference in their entireties.

FIELD OF THE DISCLOSURE

The invention relates to a method for protecting components of a steer-by-wire steering system, to a control unit for carrying out the method, a computer program with program code means, and to a steer-by-wire steering system.

BACKGROUND

DE 10 2018 208 199 A1 discloses an actuator with a spindle drive of a steer-by-wire steering system for a motor vehicle. The spindle drive comprises a spindle with a spindle thread and a positionally fixed spindle nut with a nut thread, which is driven in rotation. In this case the spindle thread and the nut thread are in the form of self-locking movement threads for the exclusive axial displacement of the spindle relative to the spindle nut, which is fitted in a fixed position in the actuator. The spindle thread and the nut thread are pressed against one another in the longitudinal direction of the spindle by means of a thread ring, and the flanks of the spindle and the spindle nut are permanently in contact with one another. Owing to the self-locking and the pressure, and above all due to lateral forces from the chassis that act upon the spindle, severe friction takes place. Lubricant mitigates this friction, but during the operation of the steer-by-wire steering system constant high loading results in severe heating of the spindle drive and the components around it, and also of the lubricant. Mechanical and electrical components are stressed thereby, and the lubricant can lose its tribological properties, which can have a negative effect upon the lifetime of the steer-by-wire steering system.

SUMMARY

A purpose of the present invention is to reduce the thermal stressing of the steer-by-wire steering system to a non-critical range.

This objective is achieved by a method as disclosed herein. Advantageous further developments of the method and further aspects of the invention are also disclosed, which include a control unit for carrying out a method, a computer program with program code means, and a steer-by-wire steering system.

The invention relates to a method for protecting the components of a steer-by-wire steering system, where the steer-by-wire steering system comprises a self-locking spindle drive. The spindle is displaced linearly by driving in rotation a spindle nut mounted in a fixed position. The rotary drive is preferably in the form of an electric motor and drives the spindle nut either directly by means of an electric motor with a hollow rotor or, in a preferred variant, by means of a transmission system, preferably a toothed-belt transmission. In this case the electric motor is arranged coaxially with the common longitudinal axis of the spindle and the spindle nut. When the spindle nut is rotated in one or the other direction, then the spindle, which is permanently engaged with the spindle nut, is moved along its longitudinal axis in one or the other direction. The movement thread is preferably configured as a trapezoidal thread. Preferably, a metric ISO trapezoidal thread according to DIN 103 is used. This thread can be designed to be self-locking and, in contrast to a ball screw drive, is characterized by a high level of friction.

The steering system of a motor vehicle must be designed to be wheel-guiding. The wheels of a steered axle must maintain the set wheel angle so that the vehicle can maintain the desired trajectory, for example driving straight ahead or around a curve. Thus, the steering system not only changes the wheel angle, but also ensures that the angle is maintained. With a motor vehicle, particularly when driving around a curve, large lateral forces are produced which act upon the wheels. These lateral forces act upon the spindle of the steer-by-wire steering system because it is connected indirectly via a steering rod or directly to a wheel carrier on which a wheel is mounted and can rotate. With increasing speed and depending on the radius of the curve, the lateral forces increase. Larger lateral forces demand larger actuation forces in the steer-by-wire steering system, which increase the friction in the spindle drive. But even when driving very slowly the largest actuation forces occur, and these are in fact highest when the vehicle is at rest. The reason for this is that a normal force acts upon each wheel—due to the mass of the vehicle—and the weight force is distributed approximately uniformly among the number of tires. Each tire stands with its contact surface against the road. To steer the tire, it has to be rotated about its vertical axis. This is done by the steering system, which acts upon the wheel carrier. Accordingly, a torque must be large enough to overcome the friction and the acting normal force of the tire against the road. During the steering movement the spindle presses against the wheel carrier in order to steer it, with the wheel, about the vertical axis of the wheel. Thereby the friction in the movement thread of the spindle drive is increased. The effect is thus as the lateral force acting upon the spindle, so that when the vehicle or its tires are at rest the forces are greatest.

Thus, the high forces on the spindle increase the friction in the movement thread of the spindle drive of the steer-by-wire steering system. The friction generates heat in the movement thread. Particularly with large steering angles, for example while parking the vehicle, longer linear displacements, in other words actuating paths, of the spindle are required. Thus, the heat input in the case of large actuating paths is even greater than with small actuating paths. Over a prolonged time, the heat input can become so large that the lubricant is heated sufficiently for its tribological properties to deteriorate. Sometimes the lubricant can even reach or exceed its boiling point and the lubricant will then fail. Without any lubricant the flanks of the thread of the spindle drive are severely worn and the spindle drive may fail prematurely. Other mechanical or even electrical components too can be strongly heated and therefore also damaged.

For a spindle drive, and ultimately for the steer-by-wire steering system, in its structure and design a maximum thermal load is determined for its operation. This is for example around 140 degrees Celsius for a certain time. To avoid the above-mentioned heat input resulting in exceeding the maximum thermal loading, in the steer-by-wire steering system sensors could be used to detect the existing temperature. However, the actual thermal loading in the movement thread is difficult to measure or detect by means of sensors, because the spindle nut rotates and thereby the spindle moves linearly. Thus, a measurement directly at the friction partners is virtually impossible. Sensors or a sensor system in the housing would also entail connecting it or them electrically to an evaluation unit. This would incur additional costs for the production of the steer-by-wire steering system.

Surprisingly, it has been found that the maximum thermal load can be determined very well by estimation. According to a first aspect of the invention, to estimate a maximum thermal load as a function of the speed of the vehicle, the linear displacement of the spindle relative to the spindle nut with respect to time can be summed continuously. For this, the linear displacement, also called the travel path, is integrated continuously with respect to time. This can be done in a simple manner by calculating the integral of the travel path with respect to time. During this calculation, the summing is continued until a first threshold value is reached. In other words, a temperature integral is formed. Assuming the relationships between the adjusting stroke covered and the quantity of heat generated by the linear displacement, the expected temperature variation can be determined very accurately with reference to the adjusting stroke covered. Knowing the materials of the movement thread and its friction coefficient, as well as the maximum forces that act upon the spindle and also the maximum displacement of the spindle, the said first threshold value is established for the steer-by-wire steering system concerned. Thus, the threshold value is a magnitude that represents the maximum acceptable thermal load. During the formation of the integral it is compared continually with the threshold value. When the threshold value is reached the operation of the spindle drive and thus the steer-by-wire steering system is reduced, as explained in more detail below.

Preferably, during the displacement a decay value, also called the cooling value, is subtracted cyclically from a current value of the temperature integral at the time. In particular, the decay value is independent of the driving situation, which is therefore not taken into account. The decay value is preferably subtracted from the value of the temperature integral at intervals of 20 to 60 ms, preferably every 40 ms. Thus, a natural cooling of the spindle drive and the steer-by-wire steering system after a certain time is taken into account. The physical reason for this is that cooling takes place due to convection and especially more quickly at high vehicle speeds.

In a preferred embodiment, when the threshold value is reached further displacement of the spindle is restricted and/or the driving torque of the spindle nut is reduced, at least temporarily. In particular, the driving torque is reduced to almost 0 Nm, preferably to zero Newton-meters in order to reduce any further thermal loading of the spindle drive. The restricted displacement can mean a reduction of the travel path. Alternatively, or in addition, the angular speed of the spindle nut can also be adapted.

In a further embodiment, once the first threshold has been reached and the displacement of the spindle is restricted, the decay value is continually subtracted from the temperature integral. When a second threshold value is reached, the restriction of the displacement is deactivated. The second threshold can also be known as the reactivation threshold. The reactivation threshold takes into account that after a certain period of restricted operation of the steer-by-wire steering system, cooling will have taken place enough to allow reversion to the unrestricted operation of the steer-by-wire steering system. Once the reactivation threshold has been reached, the spindle can again be moved with its maximum adjusting stroke.

The difference between a restricted and an unrestricted operation of the steer-by-wire steering system can become perceptible in the form of marked power differences. This would be perceived by the driver or the passengers as abrupt steering movements, which is undesirable. Thus, preferably the change from the restricted to the unrestricted displacement of the spindle should take place gradually so that no abrupt, in other words sudden, steering movements take place. For the vehicle concerned, in each case the steer-by-wire steering system is designed in such manner that both the driver and the passengers generally do not notice any difference between a restricted and an unrestricted operation of the steer-by-wire steering system. In other words, a gradual change is understood to mean a change that takes place bit by bit.

The estimation of the maximum thermal load according to the invention requires a safety device which, having regard to the safety provisions in force for the steering systems in vehicles and to the longevity of the steer-by-wire steering system, can be used to good effect. This is an inexpensive solution which preferably runs as safety functions on the existing control unit of the steer-by-wire steering system.

It was stated above that the method is carried out as a function of the speed of the vehicle. The speed of the vehicle goes hand in hand with the rotation of the wheels. As also already said earlier, the torque changes as a function of the rotary movement (rotation) of the wheels, which has to be overcome in order to rotate the wheels about the vertical axis. Surprisingly, it has been shown that to take account of the speed of the vehicle, ranges of different vehicle speeds can advantageously be established. Thus, it is not necessary to take account of every actual vehicle speed, but rather, it is sufficient to take account of the vehicle speed in certain ranges or, in other words, band widths. In a preferred embodiment therefore, to take into account the speed of the vehicle, a number of ranges of different vehicle speeds are established, and one or more such ranges can be taken into account when forming the temperature integral (summation of the linear displacements of the spindle relative to the spindle nut, with respect to time).

A first range is established, which characterizes the vehicle when it is at rest (speed=0 km/h), in which range the summing of the linear displacements of the spindle relative to the spindle nut with respect to time takes place continually. As already stated above, when the vehicle is at rest the largest actuating forces are required. In other words, this is where the largest heat input into the spindle drive takes place. Thus, the formation of the temperature integral to its full extent when the vehicle is at rest makes sense for determining the maximum thermal load.

In addition, a second range is established, which takes into account moderate speeds of about 10 to 50 km/h, and for this range, a coefficient is formed such that the summing takes place to a reduced extent. The formation of the coefficient is based, for example, on empirical determinations. Here, this is a medium range in which it is still rational to take the tire contact forces into account, because by doing so, although the actuating forces are smaller than when the vehicle is at rest, the said actuating forces can still be expected to increase the heat input into the spindle drive.

Furthermore, a third range is established, which takes into account high speeds of more than 50 km/h, and in that range no summing is carried out. At high speeds the torque to be used for steering the wheels is comparatively small, or even hardly appreciable. Moreover, at high driving speeds the linear displacement is also very small. That is because, for example, during an overtaking process at a speed of 100 km/h, wheel steering angle changes of less than 1° are sufficient in the range of a few minutes.

According to a further aspect of the invention, a control unit for carrying out a method is provided. This control unit is preferably part of the steer-by-wire steering system. The control unit can be integrated in the housing of the steer-by-wire steering system. At any rate, the control unit is preferably directly associated with the steer-by-wire steering system.

A further aspect of the invention relates to a computer program with program code means, for carrying out a method as indicated above when the program is run on a computer, in particular the above-mentioned control unit.

Finally, the invention relates to a steer-by-wire steering system, which is preferably a rear-axle steering system and, as mentioned above, is equipped with a control unit that can carry out a method as described earlier.

BRIEF DESCRIPTION OF THE DRAWINGS

Below, the invention is described with reference to preferred embodiments illustrated in the drawing, which shows:

FIG. 3: A further graph of the method according to the invention.

DETAILED DESCRIPTION

Figure 1:
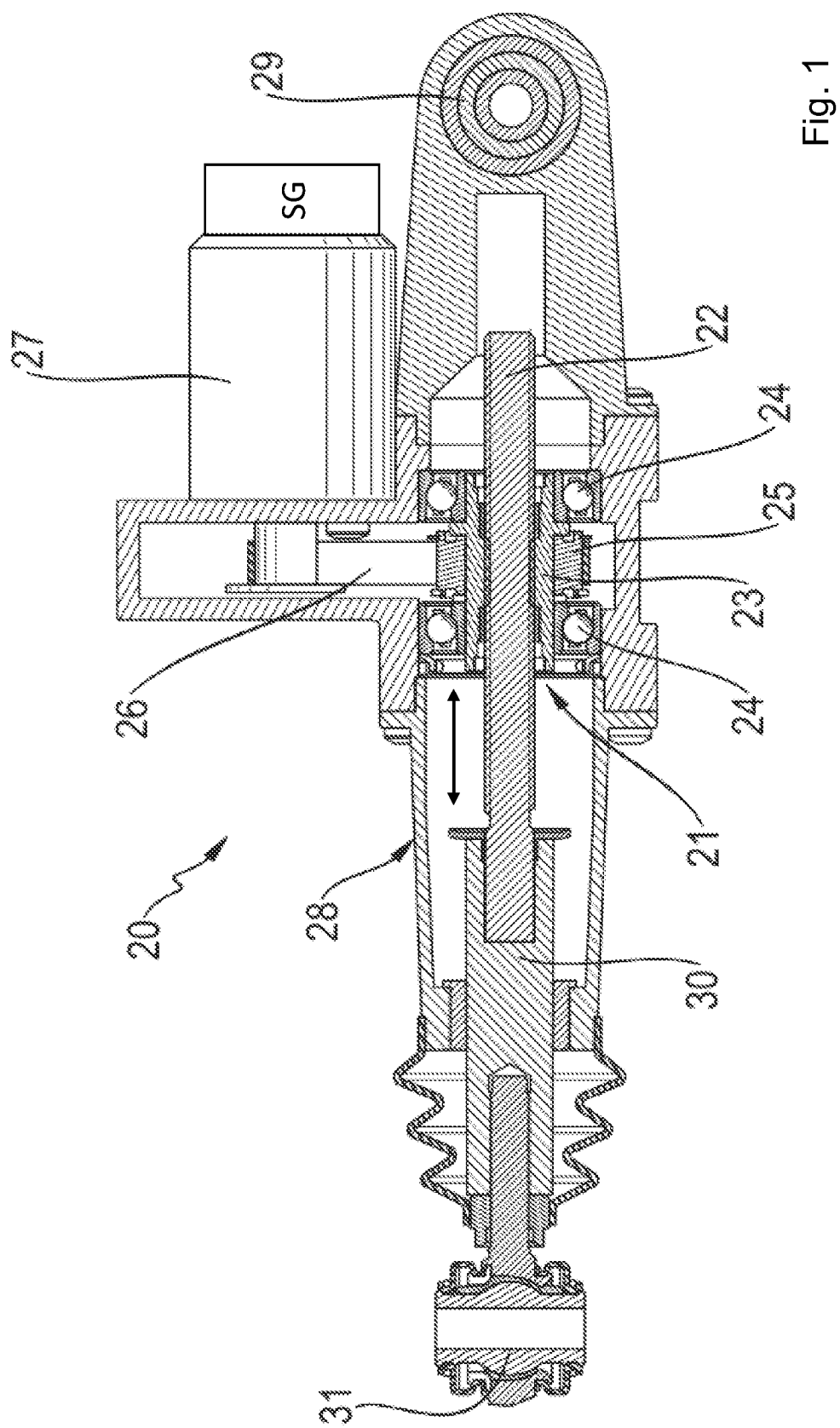
FIG. 1: A steer-by-wire steering system according to the present disclosure.

FIG. 1 shows a steer-by-wire steering system 20 according to the invention, which is used for the rear-axle steering of a motor vehicle. The steer-by-wire steering system 20 has a spindle drive 21, which comprises a spindle 22, a spindle nut 23, bearings 24 and a pulley wheel 25 that can be driven via a belt 26 by an electric motor 27. The electric motor 27 is controlled by a control unit SG which is arranged on it. By rotating the positionally fixed spindle nut 23 the spindle 22 is moved axially. The linear movement s is indicated by a double arrow. By virtue of the linear movement s the spindle 22 undergoes an actuating stroke s also called the travel path. The spindle 22 can be moved from its stop on the left as far as its stop on the right. That corresponds to the maximum actuating stroke or the maximum linear displacement. In the figure the spindle 22 is shown in its central position. The central position corresponds to a wheel steering angle of 0°, corresponding to driving straight ahead. The spindle 22 comprises an anti-rotation device (not shown), so that it cannot rotate along with the spindle nut 23 when the nut is rotated. The actuator 20 has a housing 28 which is attached to the vehicle body by way of a first joint 29. The spindle 22 is connected at one of its two ends to a screw-on shank 30, which is guided to slide axially relative to the housing 28 and, at its outer end projecting out of the housing 28, is connected to a second joint 31. By way of the said second joint 31 the actuator 20 is connected indirectly or directly via a steering rod (not shown), preferably a track rod of a rear axle, to a wheel carrier of a motor vehicle and can thus steer a rear wheel, while being supported on the vehicle side by the first joint 29.

Figure 2:
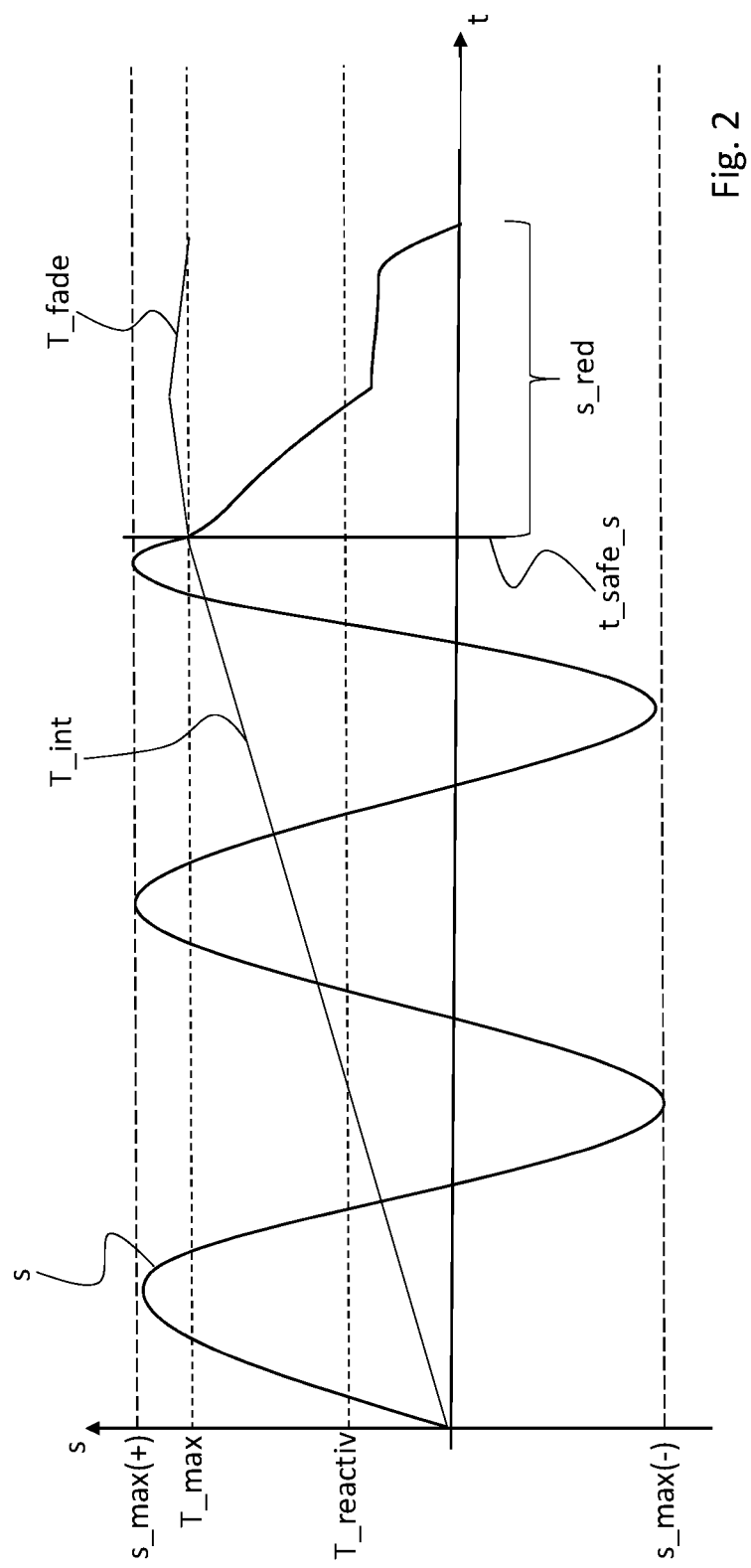
FIG. 2: A graph illustrating the method according to the invention.

FIG. 2 shows a coordinate system in which the linear displacement or actuating stroke s is plotted on the ordinate against the time t on the abscissa. Basically, by a steering system the wheels of a vehicle can be steered to the left and to the right by means of the correspondingly desired steering movement. This requires from the steer-by-wire steering system 20 or from its actuator an actuation stroke to the left or to the right. In the representations shown in FIGS. 2 and 3, the actuation stroke in the positive range means a steering movement to the left and in the negative range of the ordinate an adjustment stroke steering movement to the right. On the ordinate, maximum values s_max(+) and s_max(−) are plotted, which correspond respectively to the maximum adjustment strokes to the left and to the right. This corresponds to a linear displacement of the spindle 22 to the stops of the steer-by-wire steering system 20 on the left and on the right. Furthermore, on the ordinate a first threshold value T_max and a second threshold value T_reactiv are shown. The line shown as rising linearly represents a temperature integral T_int. It can be seen that the actuation stroke s or linear displacement of the spindle with the maximum steering movement or actuation stroke s_max(+), s_max(−) with respect to time t shown in this case, is summed to give a temperature integral T_int until the first threshold value T_max has been reached. This is made clear by the time value t_safe_s on the abscissa. This means that the maximum thermal load for the spindle drive 21 or the steer-by-wire steering system 20 is reached by the steering movements leading up to that time. In other words, after that time and as a function of the actuation stroke s covered and the speed of the vehicle, heat input into the spindle drive takes place due to the friction and loading. When the first threshold value T_max is reached, then at that time point t_safe_s a protective function is activated. The curly bracket clearly indicates that after the protective function has been activated, the steer-by-wire steering system 20 is operated with a restricted actuation stroke s_red. With the restricted actuation stroke s_red the actuation stroke s is substantially reduced. Moreover, regardless of the driving situation a decay value T_fade is continuously subtracted from the temperature integral T_int. In this case that can only be seen clearly during the period of the restricted actuation stroke s_red. However, the decay value T_safe is cyclically subtracted continuously from the temperature integral T_int. But the summing is dominant to such an extent that in its graphic representation this cannot be recognized during the summing. The subtraction of the decay value T_safe corresponds to the natural cooling behavior of the spindle drive during the operation of the steer-by-wire steering system 20. This makes sense and is a realistic depiction of the actual processes in the steer-by-wire steering system 20, since between steering movements there are always short steering pauses in which no steering takes place. The reason for this is that the continuous cooling of the steer-by-wire steering system takes place mainly by convection.

FIG. 3 shows a coordinate system similar to that of FIG. 2. It shows the time variation after the first threshold value T_max has been reached and the activation of the protective function at time t_safe_s. The steer-by-wire steering system 20 is operated with a restricted actuation stroke s_red. It can be seen that the actuation stroke s is substantially reduced. The thermal load in the spindle drive 21 is clearly reduced, as shown by a falling temperature integral T_int. The decay value and its subtraction is dominant by virtue of the restricted actuation stroke s, so that a certain amount of summing is less important. So to say, the decay value T_fade, which actually corresponds to the falling temperature in the spindle drive 21, is predominant. When the temperature integral reaches a second threshold value T_reactiv, the protective function is deactivated at time t_safe_e. The steer-by-wire steering system 20 can then be operated with the normal actuation stroke s (unrestricted operation) again and the summing of the temperature integral of the actuation stroke s with respect to time t then continues.

It has been shown that by virtue of this functionality, a very good assessment of the maximum thermal load can be achieved even without temperature sensors. Advantageously therefore, there is no need for a separate, direct sensor-based determination of the temperature in the spindle drive.

INDEXES

- 20 Steer-by-wire steering system
- 21 Spindle drive
- 22 Spindle
- 23 Spindle nut
- 24 Bearings
- 25 Pulley wheel
- 26 Belt
- 27 Electric motor
- 28 Housing
- 29 First joint
- 30 Screw-on shank
- 31 Second joint
- SG Control unit
- v_veh Speed of the vehicle
- T_int Temperature integral
- T_max (First) threshold value
- t_safe_s Protective function activation time-point
- t_safe_e Protective function deactivation time-point
- T_fade Decay value
- T_reactiv (Second) threshold value
- t Time (of the movement of the spindle)
- s Actuation stroke, linear displacement
- s_max Maximum actuation stroke
- s_red Restricted actuation stroke

The invention claimed is:

1. A method for protecting components of a steer-by-wire steering system of a vehicle, wherein the steer-by-wire steering system comprises a self-locking spindle drive (21), and wherein the spindle is configured to be displaced linearly by rotating a positionally fixed spindle nut, the method comprising:
    estimating a maximum thermal load as a function of a speed of the vehicle; and
    calculating a temperature integral by summing a linear displacement of the spindle relative to the spindle nut as a function of time until the temperature integral reaches a first threshold value.

2. The method according to claim 1, further comprising subtracting periodically, during the linear displacement of the spindle, a decay value from the temperature integral at an interval from 20 to 60 ms.

3. The method according to claim 2, wherein the interval is 40 ms.

4. The method according to claim 2, further comprising restricting further displacement of the spindle and/or restricting a drive torque of the spindle nut when the first threshold value is reached at a first time-point, thereby reducing further thermal loading.

5. The method according to claim 4, further comprising:
    when the temperature integral reaches the first threshold value, restricting further displacement of the spindle by continual subtraction of the decay value until the temperature integral reaches a second threshold value at a second time-point; and
    discontinuing restriction of further displacement of the spindle after the second time point.

6. The method according to claim 5, wherein discontinuing restriction of further displacement of the spindle is performed gradually so as to prevent sudden steering movements.

7. The method according to claim 1, wherein the function of the speed defines a plurality of ranges of vehicle speeds, each of the plurality of ranges selected from:
    (i) a first range wherein the vehicle is at rest and wherein the summing of linear displacement occurs continuously,
    (ii) a second range which takes into account moderate speeds, wherein calculating the temperature integral includes applying a coefficient to reduce the summing of linear displacement, and
    (iii) a third range which takes into account high speeds, wherein in the third range no summing of linear displacement takes place.

8. A control unit for carrying out the method according to claim 1.

9. A steer-by-wire steering system, comprising the control unit of claim 8, wherein the steer-by-wire system is configured as a rear-axle steering system.

10. A non-transitory computer-readable storage medium with machine-readable code that when executed by a steer-by-wire control unit carries out the method according to claim 1.

* * * * *